United States Patent [19]

Kakinuma et al.

[11] 3,907,764
[45] Sept. 23, 1975

[54] PEPSINOSTREPINS, NOVEL PROTEASE INHIBITORS FROM STREPTOMYCES

[75] Inventors: Atsushi Kakinuma, Kyoto; Tsuneo Kanamaru, Tokyo; Hiromu Sugino, Osaka; Tsuneo Asano, Kawanishi; Masahiko Yoneda, Kobe, all of Japan

[73] Assignee: Takeda Chemical Industries, Ltd., Osaka, Japan

[22] Filed: Apr. 9, 1973

[21] Appl. No.: 349,129

[30] Foreign Application Priority Data
Apr. 7, 1972 Japan.............................. 47-35375
July 7, 1972 Japan.............................. 47-68415

[52] U.S. Cl.............. 260/112.5; 195/80 R; 424/177
[51] Int. Cl.$^2$.................. C07C 103/52; C12B 1/00; A61K 37/26
[58] Field of Search................. 260/112.5; 195/80 R

[56] References Cited
UNITED STATES PATENTS
3,740,319  6/1973  Umezawa et al................. 195/80 R

OTHER PUBLICATIONS

Umezawa et al.: J. of Antibiotics, 23, 259–262 (1970).

Morishima et al.: J. of Antibiotics, 23, 263–265 (1970).

Primary Examiner—Elbert L. Roberts
Assistant Examiner—Reginald J. Suyat
Attorney, Agent, or Firm—Wenderoth, Lind & Ponack

[57] ABSTRACT

Protease inhibitor which has strong inhibitory action against pepsin and other acid protease is produced by a microorganism of the genus Streptomyces. The protease inhibitor is recovered from the culture medium and purified and the purified protease inhibitor is used as an effective drug for the prevention and cure of hyperpepsia, hyperpepsinia and gastric and duodenal ulcers.

4 Claims, 7 Drawing Figures

Figure 1:
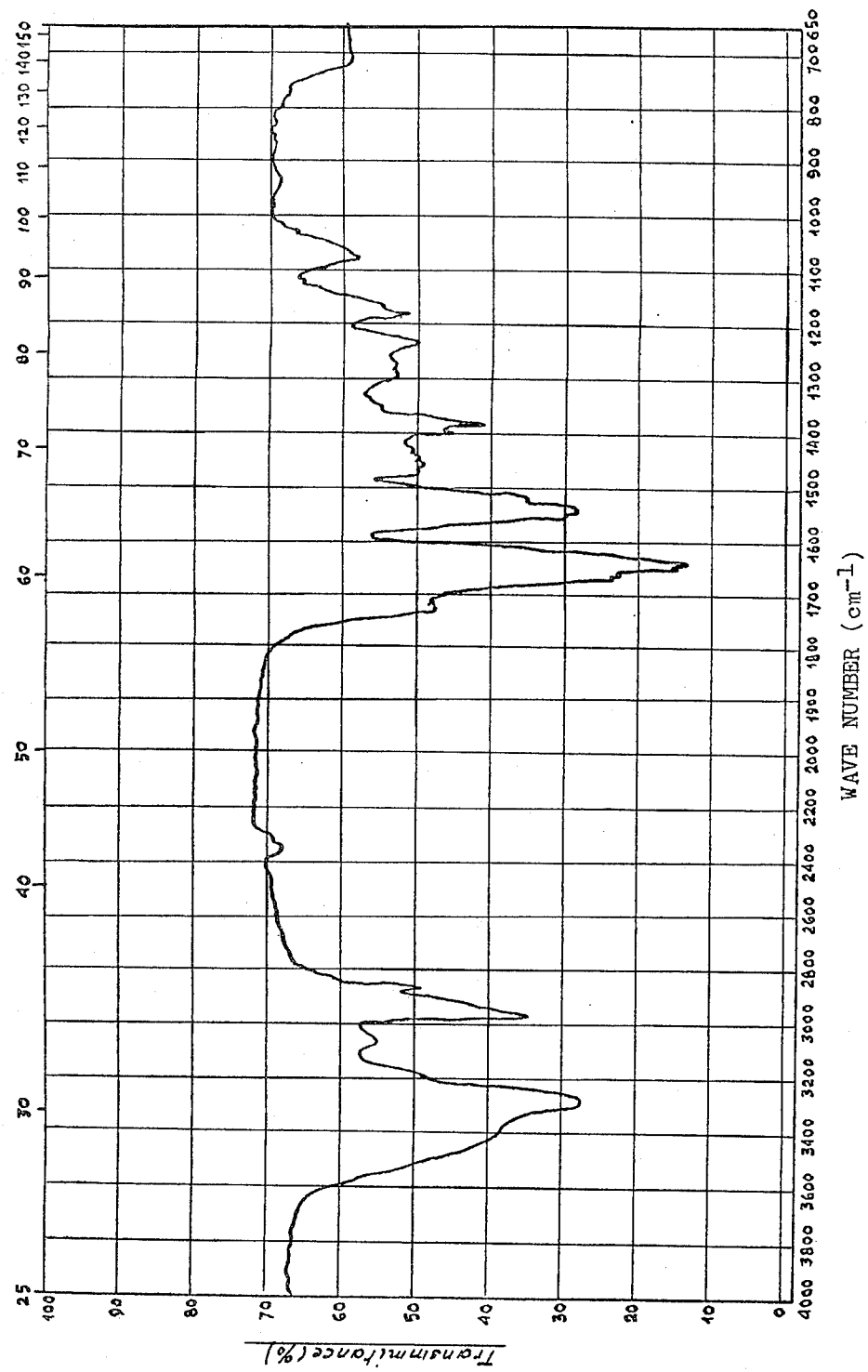
Figure 2:
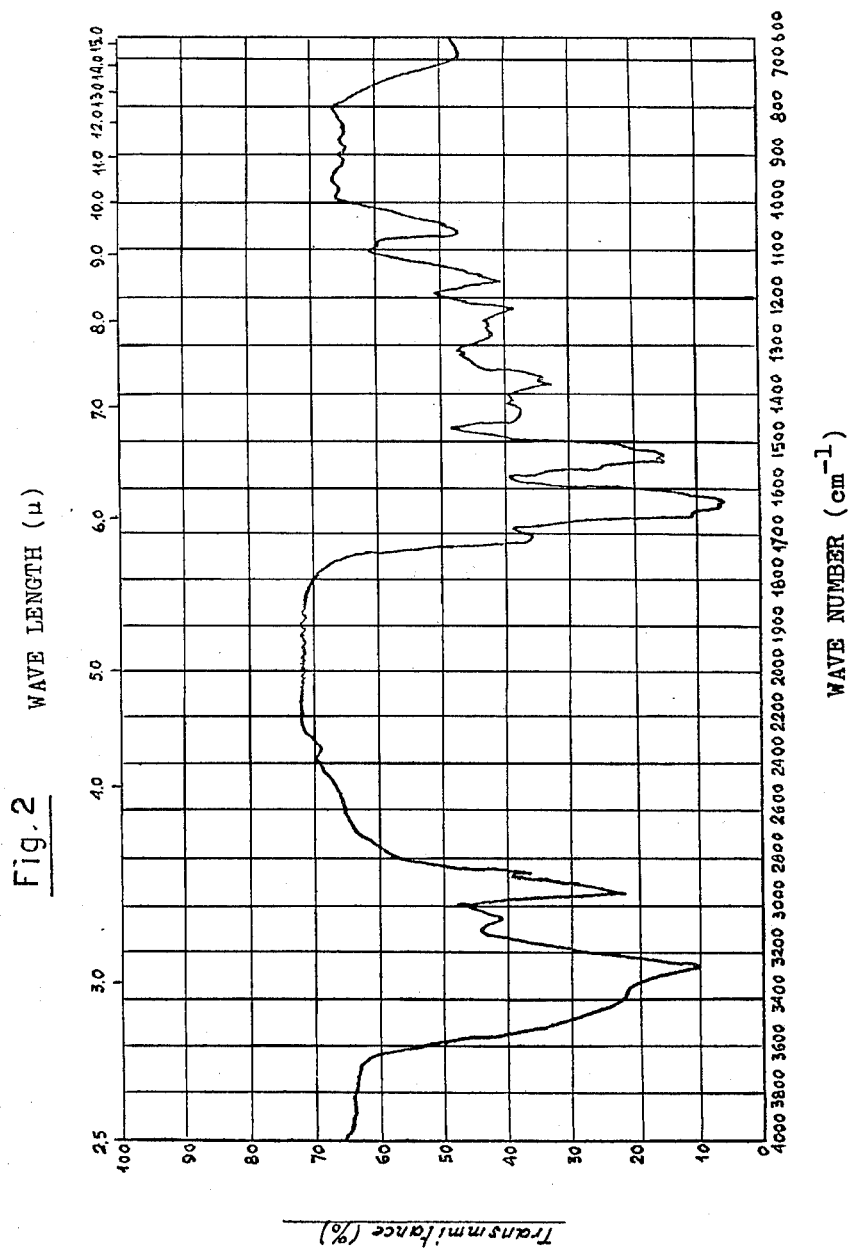

Fig.1 Infrared Absorption Spectrum of Pepsinostreptin (KBr)

Figure 3:
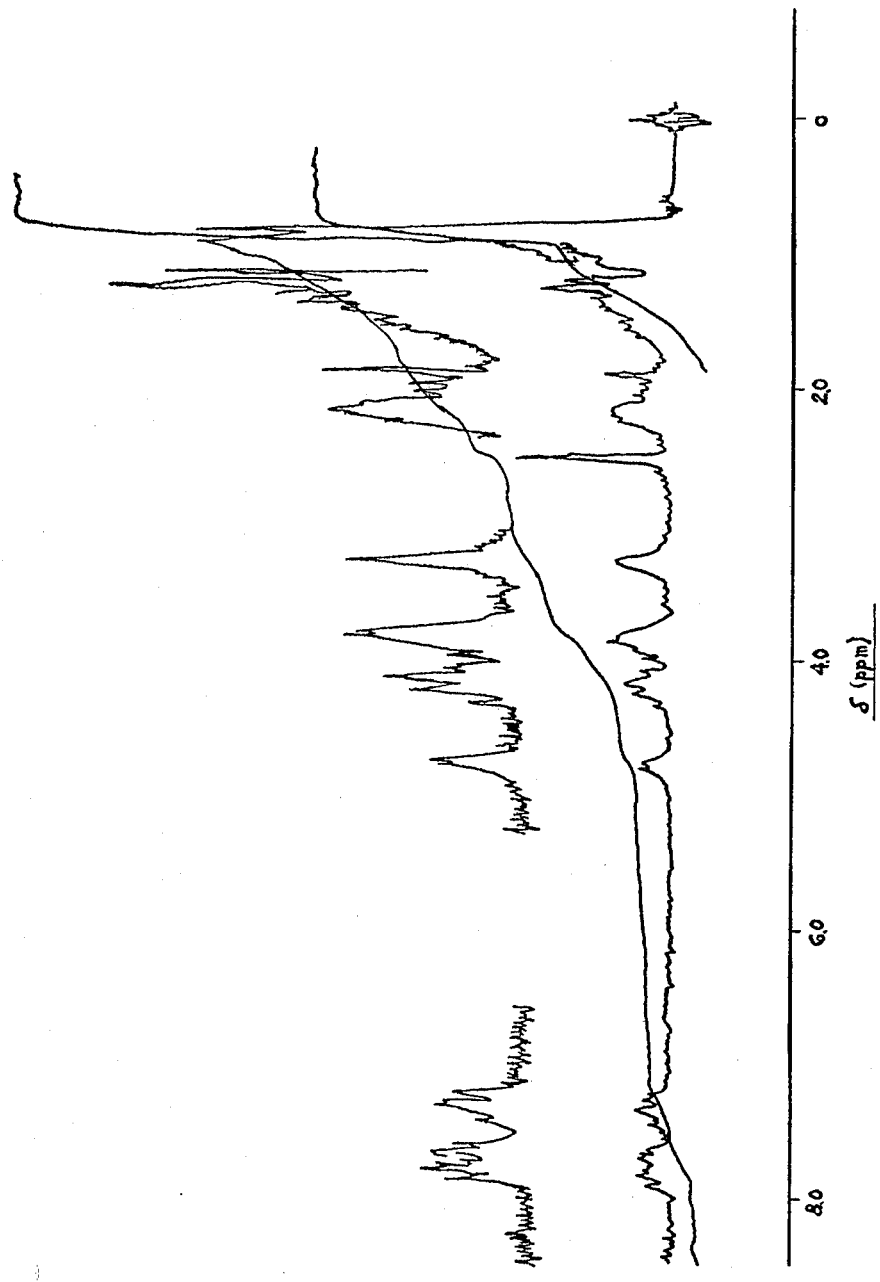
Figure 4:
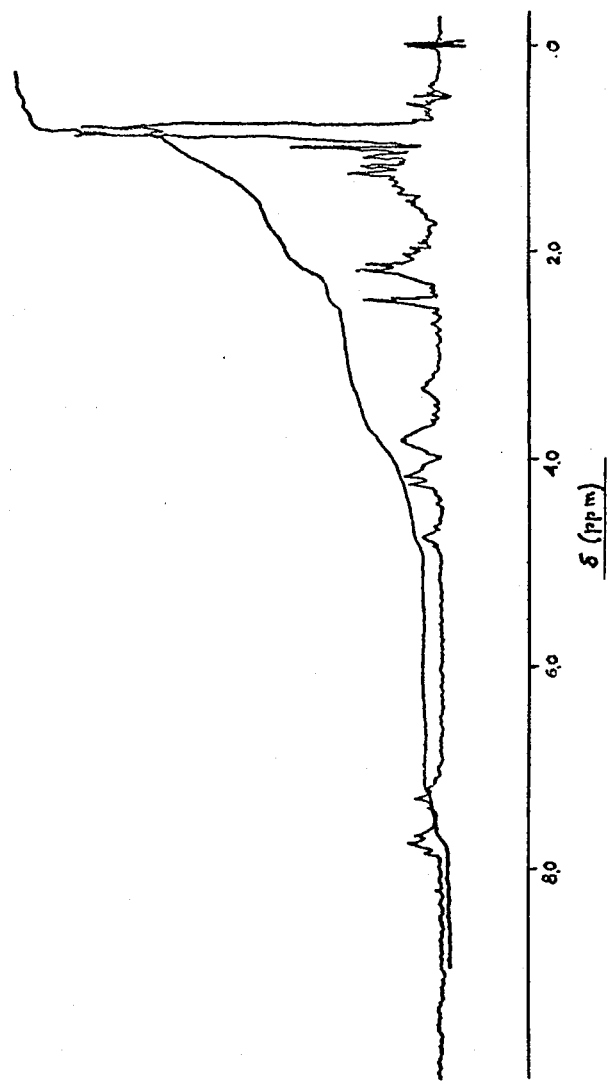

Fig. 3  Nuclear Magnitic Resonance Spectrum of Pepsinostreptin (DMSO-d6)

Figure 5:
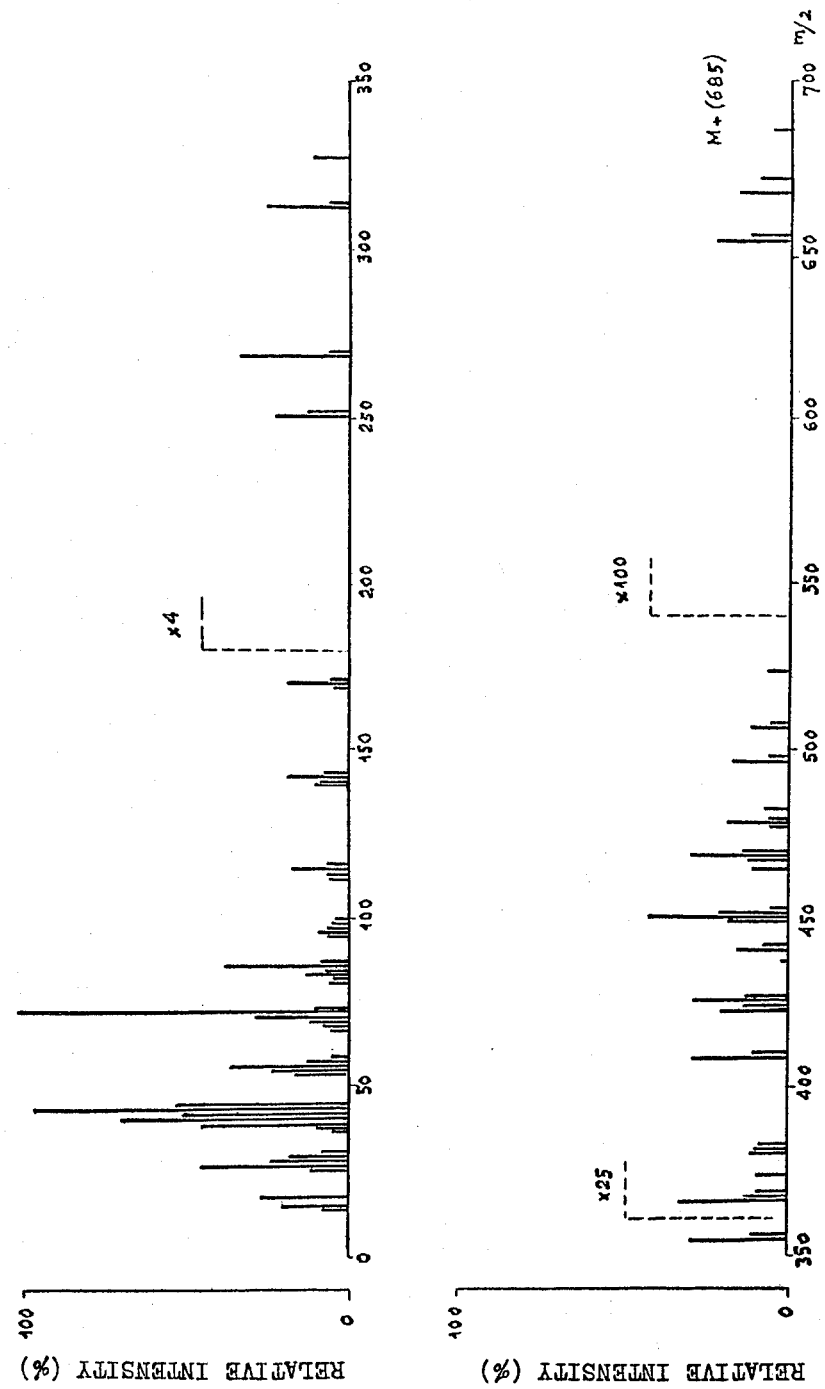
Figure 6:
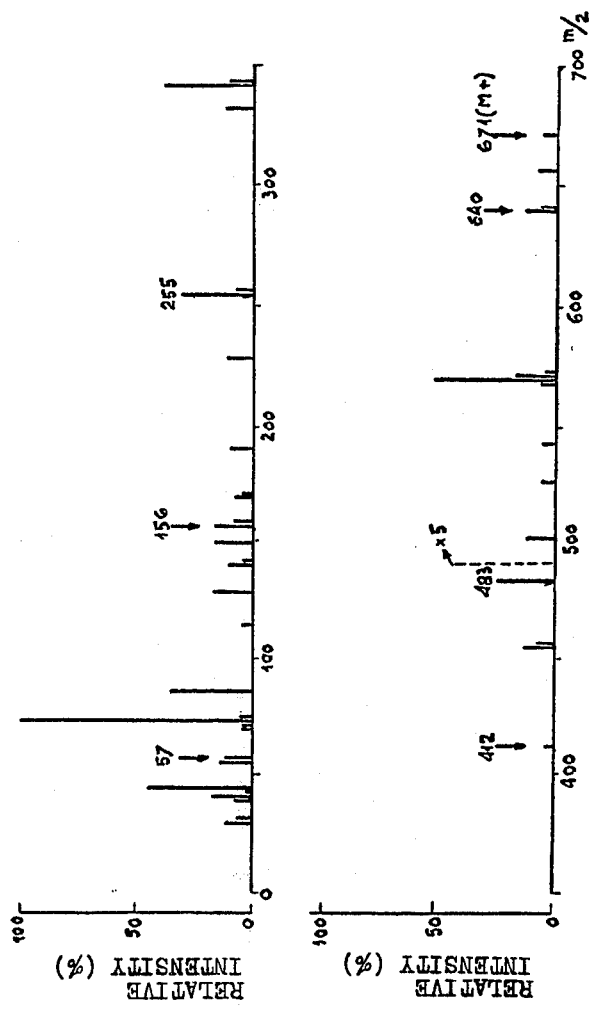

Fig. 5 Mass Spectrum of Pepsinostreptin

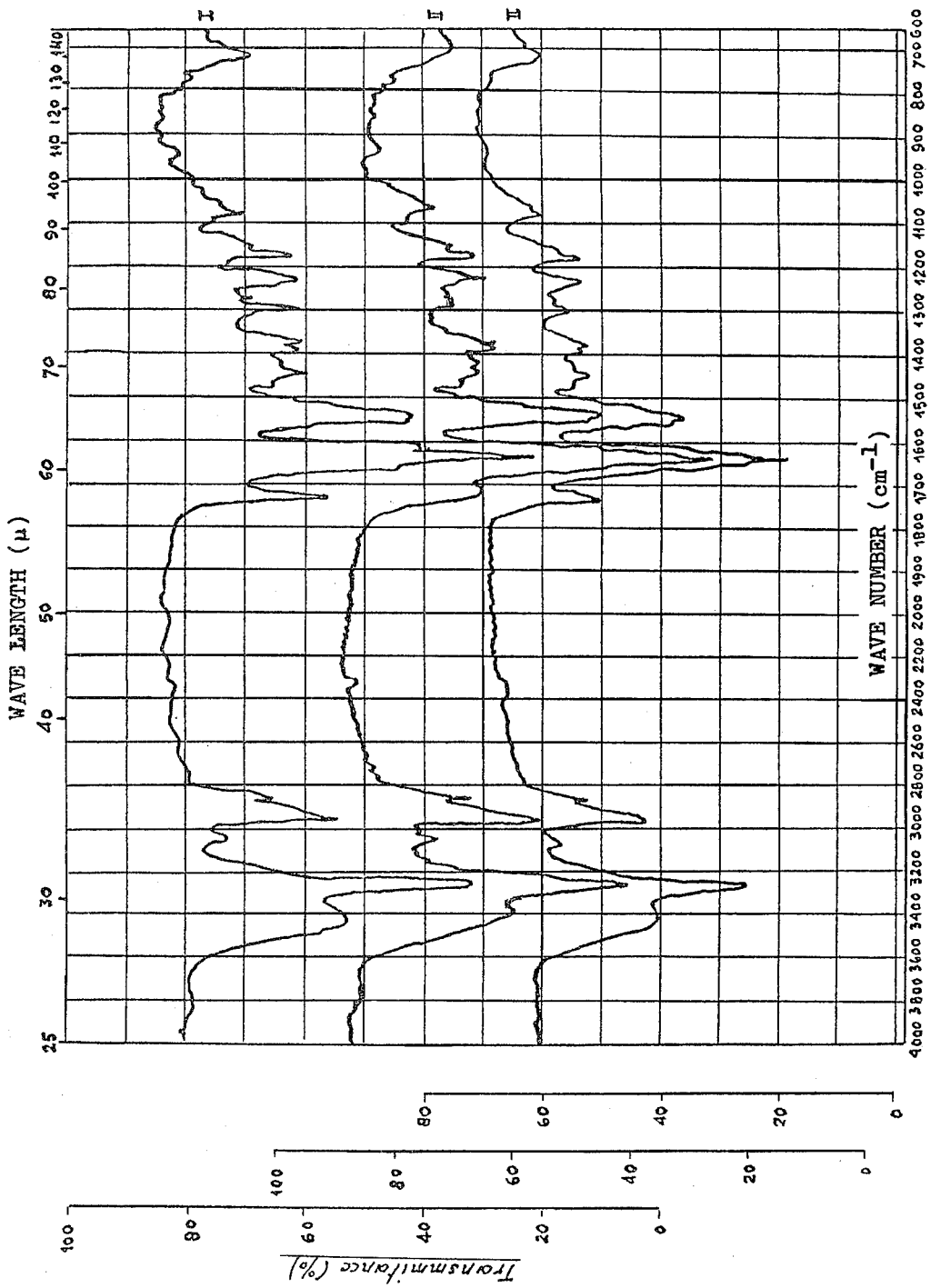

PEPSINOSTREPINS, NOVEL PROTEASE INHIBITORS FROM STREPTOMYCES

This invention relates to a novel protease inhibitor and a process for the production thereof.

An extensive survey of microbial metabolites which the present inventors conducted in search for a new protease inhibitor led to the finding that certain strains of the genus Streptomyces are capable of accumulating a substance or substances which strongly inhibit the activities of pepsin and several other acid proteases. Subsequent studies enabled the inventors to successfully isolate these substances in a crystalline form. Taking note of their properties, the present inventors designated two of these inhibitors 'pepsinostreptin' and 'pepsinostreptin-P' and after further studies, they completed the present invention.

Thus, the main object of this invention is to provide pepsinostreptin, pepsinostreptin-P and their methyl esters, which are singly or as a mixture of more than one referred to simply as 'pepsinostreptins' in this specification, if not specified otherwise.

Another object of this invention is to provide a process for the production of pepsinostreptins. Further object is to provide a pharmaceutical composition comprising pepsinostreptins.

These objects are realized by cultivating a microorganism of the genus Streptomyces capable of accumulating pepsinostreptins in a medium to cause the microorganism to produce the objective substance(s) in the resultant culture broth and subsequently recovering them from said broth.

FIGS. 1–6 indicate an infrared absorption spectra, nuclear magnetic resonance spectra and mass spectra of the methyl ester, of Pepsinostreptin and Pepsinostreptin-P as disclosed in Table 3.

FIG. 7 indicates the infrared absorption spectra for compounds I, II and II-methyl ester as obtained in Example 2.

In the method of this invention, any strain of the genus Streptomyces that is capable of producing pepsinostreptins can be successfully employed. Typical strains are, for example, those of *Streptomyces ramulosus*, *Streptomyces citricolor* and *Streptomyces catenulae*. Thus, we may mention the following known strains by way of example.

| | |
|---|---|
| *Streptomyces ramulosus* (open to public in IFO catalog of 1972) | IFO 12812 |
| *Streptomyces citricolor* | Ferm-P No.393 (ATCC 21925) |
| *Streptomyces catenulae* | IFO 12848 (ATCC 12476) |

The numbers after 'IFO', 'ATCC' and 'Ferm-P' respectively indicate the accession numbers at Institute for Fermentation, Osaka, Japan; at American Type Culture Collection in Rockville, Maryland, U.S.A.; and at Fermentation Research Institute, the Agency of Industrial Science and Technology, Japan.

The method of screening these micoorganisms is as follows. Microorganisms of the genus Streptomyces are grown in a liquid medium and the pepsin-inhibitory activity of each culture is assayed on a casein-pepsin agar plate. A pepsinostreptins-producing strain can then be selected from among the strains which show high inhibitory activities in the above assay.

In the present invention, a pepsinostreptins-producing strain is cultivated in a culture medium. The medium may be either liquid or solid, but, usually, shake culture or aerobic culture with stirring is more convenient.

The composition of the medium is optional so long as the employed strain may grow therein to accumulate said protease inhibitor. Thus, the medium may contain, as carbon sources, glucose, lactose, glycerin, starch, sucrose, dextrin, molasses, organic acids, etc., and as nitrogen sources, peptone, protein hydrolyzates, e.g. casamino acid (Difco Laboratories), N-Z-Amine (Sheffield Chemical), etc., meat extract, yeast extract, soybean cake, corn steep liquor, amino acids, ammonium salts, nitrates and other organic and inorganic nitrogenous compounds. By way of inorganic salts, various phosphates, magnesium sulfate, sodium chloride, etc. may be incorporated in the medium. Further, to promote the growth of microorganisms, such factors as vitamins and nucleic acid analogs may also be added. Moreover, the present inventors have discovered that if valine, N-acylvaline and/or isobutyric acid is further incorporated in the culture medium, the accumulation of pepsinostreptin and/or pepstinostreptin methyl ester is significantly increased, and that when propionic acid is added, the accumulation of pepsinostreptin-P and/or its methyl ester is increased. The N-acyl group of said N-acylvaline is exemplified by N-acetyl and N-benzoyl. The recommended amounts of these additives are about 0.25 to 5.0 percent and, preferably, about 2 to 4 percent for valine and N-acylvaline; about 0.25 to 2.0 percent and, preferably, about 0.5 to 1.0 percent for isobutyric acid; and about 0.25 and 5.0 percent to, preferably, about 0.5 to 3.0 percent for propionic acid, respectively. Isobutyric acid and propionic acid may be added in the form of sodium salt or potassium salt. These additives may be added at the start of cultivation or in several installments over the cultivation period. By growing the microorganisms in the presence of these additives, the accumulated amount of the objective pepsinostreptins can be increased about 10 to 20 fold at the maximum.

The incorporation of an antifoam agent such as silicone oil, a polypropylene glycol derivative or soybean oil in the medium is conducive to enhanced yields of pepsinostreptins.

In cultivating the microorganism, it is recommended to carry out a small-scale preculture and, then, inoculate the fermentation medium with the resultant preculture. The conditions of cultivation including the temperature and incubation period, pH of the medium, etc. are selected and controlled so that the accumulation of objective pepsinostreptins will be maximum. In many cases, it is sufficient to cultivaate the strain aerobically at about 20° to 35°C for 1 to 6 days while the medium is being held in the pH range of about 4 to 9.5.

The resultant culture broth contains pepsinostreptins. When a liquid medium is employed, the objective substance(s) is predominantly accumulated in the fluid phase. Therefore, it is recommended first to remove the mycelia from the culture broth by filtration or centrifugation and, then, isolate the pepsinostreptins from the resultant filtrate or supernatant, although the product(s) may optionally be harvested without previous removal of the mycelia. The separation and purification of the objective substance(s) from the culture broth can be easily effected using various procedures in a suitable combination, the choice of a particular combination depending upon the chemical characteristics of pepsinostreptins. Thus, one may employ such techniques as precipitation with a precipitant, e.g. ammonium sulfate; extraction with an organic solvent which is not readily miscible with water and in which pepsinostreptins and soluble, e.g. n-butanol; dissolution in a highly polar solvent such as methanol or ethanol; removal of impurities by treatment with, for example, ethyl acetate or hexane; gel filtration by the use of various types of dextran beads, e.g. Sephadex (Pharmacia Fine Chemicals) or the equivalent; ion-exchange chromatography with various ion exchangers such as ion exchange resin, ion exchange cellulose, ion exchange Sephadex (Pharmacia Fine Chemicals), etc.; adsorption chromatography on various adsorbents, e.g. activated carbon, aluminum, silica gel or macromolecular adsorbents, e.g. Amberlite XAD-1 and 2(Rohm & Haas); and so forth. Of course, besides these techniques, one may have resort to any other purification procedure suited for the properties of pepsinostreptins. By using some of these procedures in a suitable combination, pepsinostreptins can be isolated in a crystalline state from the culture broth.

Pepsinostreptin, pepsinostreptin-P and their methyl esters can be detected separately from each other on a casein-pepsin agar plate after silica gel thin layer chromatography using appropriate solvent systems as developping agent. Examples of such solvent systems and Rf values of four pepsinostreptins with these solvent systems are shown in Table 1.

Table 1

| Pepsinostreptins | Rf values in | |
|---|---|---|
| | Solvent A | Solvent B |
| Pepsinostreptin | 0.40–0.50 | 0.55–0.65 |
| Pepsinostreptin-P | 0.35–0.45 | 0.40–0.50 |
| Pepsinostreptin methyl ester | 0.75–0.85 | 0.68–0.78 |
| Pepsinostreptin-P methyl ester | 0.73–0.83 | 0.56–0.66 |

Solvent A: Ethylacetate - methanol (4:1)
Solvent B: n-Butanol - acetic acid - water - n-butylacetate (20:1:1:20)

Thus, by employing two-dimensional silica gel thin layer chromatography with solvents A and B as developping agents, pepsinostreptins can be separately detected.

Separation of any one of pepsinostreptins from a mixed solution of more than one of them can also be effected by the application of said detection principles. Thus, for example, the separation of each component from the mixture of four pepsinostreptins can be accomplished by the combination of two sequential column chromatographic procedures:

1. Firstly, pepsinostreptin and pepsinostreptin-P are separated from their methyl esters by silica gel column chromatography with ethylacetate-methanol (5:1) as eluting solvent, and 2. secondly, the separation of pepsinostreptin from pepsinostreptin-P or pepsinostretin methyl ester from pepsinostreptin-P methyl ester is effected by silica gel column chromatography with n-butanol-acetic acid-water-n-butyl acetate (30:1:1:30) as eluting solvent.

For the separation of pepsinostreptin from pepsinostreptin-P in the second step, use can be made of a column chromatography on a macromolecular adsorbent such as Amberlite XAD-2(Rohm & Hass) with alkaline methanol solution as eluting solvent.

The chemical structures of pepsinostreptins which can thus be obtained have been established, from the results of various chemical and physicochemical analyses that will be described in Examples appearing hereinafter, as:

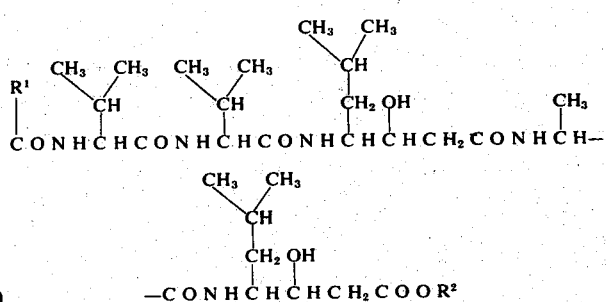

In the above formula, $R^1$ is ethyl or isopropyl and $R^2$ is a hydrogen atom or methyl, and the interrelationship between structures and respective pepsinostreptins is as follows:

| $R^1$ | $R^2$ | pepsinostreptins |
|---|---|---|
| ethyl | hydrogen | pepsinostreptin-P |
| ethyl | methyl | pepsinostreptin-P methyl ester |
| isopropyl | hydrogen | pepsinostreptin |
| isopropyl | methyl | pepsinostreptin methyl ester |

Further, as will be apparent from the above chemical structures, pepsinostreptin and pepsinostreptin-P are acid compounds and, as such, can be easily converted to metal salts such as the salts with sodium, potassium, calcium and aluminum. The terms 'pepsinostreptins' and 'protease inhibitor' as used in this specification and claims cover these varied salts as well.

Pepsinostreptins are characterized by their ability to strongly inhibit the activities of pepsin and other acid proteases. The following procedure was employed to assay the pepsin-inhibitory activities.

Thus, 0.1 m$l$ of a solution of crystalline pepsin (Sigma Chemical Company) of 50 $\mu$g/m$l$ concentration was added to 1.9 m$l$ of a reaction system comprising 1.0 m$l$ of 0.6 percent solution of substrate casein (e.g.

Hammarsten's casein, E. Merck, A.G) in 0.08 M lactic acid, 0.7 ml of 0.02N HCl–0.02M potassium chloride buffer (pH 2.0) and 0.2 ml of a sample solution containing pepsinostreptins. The entire mixture (2 ml) was incubated at 37°C for 30 minutes. The reaction was terminated by the addition of 2.0 ml of 1.7 M perchloric acid solution. The mixture was further allowed to stand at room temperature for 30 minutes and, then, filtered through a filter paper. The absorbance (A) of the filtrate at 280 mμ was measured. On the other hand, a control system containing the same buffer, but free from pepsinostreptins, was treated and measured for its absorbance (B) in the same manner as above. From a calibration curve constructed by plotting absorbances against pepsin concentrations, the residual pepsin concentrations (C) and (D) of the reaction systems corresponding to (A) and (B), respectively, were determined and the protease inhibitory activity of each sample was calculated by means of the following equation.

$$\text{Percent inhibition} = \frac{D - C}{D} \times 100$$

As assayed by the above procedure, the amount of pepsinostreptins required to inhibit 50 percent of the activity of 5 μg of crystaline pepsin ($D_{50}$) was about 0.05 μg. for all pepsinostreptins.

Pepsinostreptins also inhibit the activity of the acid protease of *Rhizopus chinensis* (Seikagaku Kogyo, K.K.) and of the acid protease of *Trametes sanguinia* (*Takeda Chemical Industries, LTD.*). As assayed by a procedure similar to that described above using a 0.6 percent solution of casein in 0.05M lactic acid and a 0.05M lactic acid buffer (pH 3.0), the amount required to inhibit 50 percent of the activity of 10 μg of the acid protease of *Rhizopus chinensis* was about 0.05 μg and the amount that inhibited 50 percent of the activity of 20 μg of the acid protease of *Trametes sanguinia* was about 0.25 μg for any pepsinostreptins.

The toxicity of pepsinostreptins is extremely low and its $LD_{50}$ values as determined by acute toxicity tests in mice were not less than 3 g/kg orally for pepsinostreptin and its methyl ester and not less than 5 g/kg for pepsinostreptin-P and its methyl ester, and intraperitoneally it was 0.5 g/kg for all pepsinostreptins.

Pepsinostreptins are low in toxicity, stable at a wide pH range, hydrophilic, easily crystallizable, retained long in the stomach and have specific propensities to inhibit the activity of pepsin to prevent the release of sialic acid from gastric mucosa, and to prevent or cure ulcers in Shay rats (an artificially caused ulcer).

Thus, pepsinostreptins can be used as drugs for the prevention and cure of hyperpepsia, hyperpepsinia, gastric and duodenal ulcers, of which pepsin is said to be a causative factor, and for the normalization of gastric acidity.

By way of illustration, the effect of pepsinostreptins on the gastric ulcers in rats which have been induced by ligation of the pylorus (see Gastronenterology 5 43(1945)) are shown in Table 2. The findings attest to the effectiveness of pepsinostreptins.

Table 2

The anti-ulceration activity of peptinostreptins.

| Dosage (mg/animal) | Gastric juice | | | Ulcer index |
|---|---|---|---|---|
| | Total volume (ml) | Total acidity (μeq/ml) | Pepsin activity (μg/ml) | |
| no addition pepsinostreptin | 18.8 | 105.0 | 1520 | 4.6±0.4 |
| I 0.2 | 16.7±0.7 | 122.6±1.9 | 106±54 | 1.2±0.2 |
| 2.0 | 20±0.9 | 124.0±6.1 | 0±0 | 1.0±0 |
| pepsinostreptin methyl ester | | | | |
| 0.2 | 17.4±1.1 | 106.6±15.8 | 136±89 | 1.4±0.4 |
| 2.0 | 18.8±0.5 | 122.0±2.5 | 0±0 | 0.8±0.2 |
| no addition pepsinostreptin-P | 14.5±1.5 | 112.5±1.5 | 1253±58 | 4.0±0.6 |
| II 0.5 | 17.8±1.0 | 95.6±4.0 | 123±35 | 1.3±0.2 |
| 1.0 | 16.5±0.8 | 85.2±5.4 | 37±64 | 0.9±0.2 |
| pepsinostreptin-P methyl ester | | | | |
| 1.0 | 16.0±1.1 | 80.5±8.5 | 23±16 | 1.0±0.2 |

(Note to Table 2)

Rats, male, SD, 7 weeks old, each group consisting of 5 animals. Immediately after ligation of the pylorus, animals were orally administered with respective pepsinostreptins. Then, after 16–17 hours, the stomach of each animal was examined and ulcer indexes were scored by the following scheme.

0 : Normal without ulcers

1 : No ulcers, but haemorrhagic spots or erosions are observed.

2 through 4: Intermediate between 1 and 5; with ulcers but without perforations.

5 : Perforations: Most rats have been killed.

Of 18 patients with peptic ulcers (13 gastric ulcers, 4 duodenal ulcers and 1 gastroduodenal ulcers; 14 male and 4 female patients, aged from 19 to 64), 12 were administered with pepsinostreptin and 6 were administered with pepsinostreptin methyl ester, both at a daily dosage of 200 mg in 4 installments at 2 to 3 hours after each meal and before sleeping at night and the patients were examined after 4 weeks.

1. Conspicuous healing tendencies observed on X-ray and gastoscopic examinations: 13 cases (disappearance of ulcers: 10; alleviation of ulcers: 3)
2. Disappearance of subjective symptons: 14 cases
3. Reduction of gastric acidity (from hyperacidity to normal): 4 out of 7
4. Tests for occult blood in feces: negative in 13 cases In the same manner pepsinostreptin-P was administered to 6 patients with peptic ulcers (3 gastric ulcers, 2 duodenal ulcers and 1 gastroduodenal ulcer; 5 males and 1 female, aged 23 to 64) at a daily dose of 200 mg in 4 installments at 2 to 3 hours after each meal before sleeping at night, and after 4 weeks, the patients were examined.

1. Conspicuous healing tendencies observed by X-ray and gastroscopic examinations: 5(disappearance of ulcers: 4; alleviation of ulcers: 1)
2. Disappearance of subjective symptons: 5
3. Reduction of gastric acidity (from hyperacidity to normal): 1 out of 3

4. Test for occult blood in feces; negative in 5 cases. In none of these cases was any side-effect detected.

In another experiment, pepsin activities of gastric juice samples from a gastric ulcer case (male, 23 of age) were 0.40 mg/ml for basal gastric juice after fasting and 0.67 mg/ml for a gastric juice sample taken 45 minutes after tetragastrin stimulation, and 50 percent of the proteolytic activity corresponding to 2 μg. of pepsin in those gastric juices was inhibited by 0.061 μg. and 0.051 μg., respectively, of pepsinostreptin and inhibited by 0.058 μg. and 0.050 μg., respectively, of pepsinostreptin-P.

In the above application, the recommended daily dosages of pepsinostreptin, pepsinostreptin-P, and their methyl esters and metal salts for adults are about 1 mg. to 10 g., and preferably, 5 mg. to 5 g., in oral administration.

The pepsinostreptins may be administered alone or in combination with a pharmaceutically acceptable carrier or carriers, e.g. lactose, starch, carboxymethyl cellulose, sweetening agent, vegetable oils, surfactants, arabic gum. They are administrable in the forms of powders, tablets, solutions or emulsions for oral administration.

Pharmaceutical compositions containing one or more of the pepsinostreptins can be prepared by per se conventional methods for the preparation of powder, capsules, tablets, pills and the like. The choice of carriers may be determined depending upon the route of administration, the solubility of the pepsinostreptins, and so on.

This invention will be further illustrated by the following examples. It should, however, be understood that these examples are given for illustrative purposes only and by no means are limitative of this invention. In the examples the relationship between part(s) by volume and part(s) by weight corresponds to that between milliliter(s) and gram(s).

EXAMPLE 1

(1) Production of pepsinostreptins

*Streptomuces ramulosus* IFO 12812 was used to inoculate 30 parts by volume of a liquid medium (pH 7.0) in a flask with a capacity of 200 parts by volume which comprises 3 percent glucose, 2 percent corn steep liquor, 0.05 percent dipotassium hydrogen phosphate, 0.02 percent ammonium sulfate, 0.05 percent magnesium sulfate and 0.5 percent calcium carbonate and the medium was incubated on a rotary shaker at 28°C for 2 days. Fifteen parts by volume each of the resulting culture fluid was used to inoculate 500 parts by volume each of the two liquid media of the same composition as above and cultivated on a rotary shaker at 28°C for 2 days. Thus obtained culture (totally 1000 parts by volume) was used to inoculate 30,000 parts by volume of a liquid medium (pH 7.0) contained in a fermentor with a capacity of 50,000 parts by volume which was composed of 1 percent gluose, 0.7 percent peptone, 0.3 percent meat extract, 0.3 percent sodium chloride and 0.2 percent dipotassium phosphate, and with the addition of 30 parts by weight of an antifoaming agent, the fermentor was incubated at 28°C under aeration and with stirring for 5 days.

The resulting culture broth was filtered with a filter press using diatomaceous earth as filter aid and the resulting filtrate was treated with about 15,000 parts by volume of ethyl acetate. The ethyl acetate layer was discarded and the aqueous layer was treated twice with 30,000 parts by volume each of n-butanol to extract the active fraction. The n-butanol extract was concentrated and the concentrate was dissolved in 3,000 parts by volume of methanol.

The solution was passed through a column of 500 parts by volume of activated carbon and 7,500 parts by volume of the elute was collected and concentrated, whereupon 13 parts by weight of a powder was obtained.

This powder was thoroughly washed with ethyl acetate, the washings being discarded, and the residue was dissolved in 50 percent methanol.

The methanolic solution was applied on a column of activated carbon (500 parts by volume) and, after washing the column with 1,500 parts by volume of 50 percent methanol, the active fraction was eluted with 2,000 parts by volume of methanol, and the eluated was concentrated, whereupon 11 parts by volume of white powder was obtained. Further purification can be conducted in the following manner. A portion of 0.15 part by weight of this powder was dissolved in a small amount of a solvent mixture of n-butanol-acetic acid-water-butyl acetate (30:1:1:30) and the solution was run onto a column of silica gel (967 parts by volume, inner diameter to height is 4 to 77) and the active fractions were eluted with the same solvent. The first fraction (1,000 parts by volume) was discarded and the subsequent fraction of 300 parts by volume (this corresponds to the active fraction of pepsinostreptin) and the fraction of 150 parts by volume after the elution of 1,600 parts by volume (this corresponds to the active fraction of pepsinostreptin-P) were respectively collected and concentrated to dryness. Then respective concentrates were dissolved in methanol and allowed to stand at room temperature, whereupon white needles of pepsinostreptin and pepsinostreptin-P separated out. The respective crystals were repeatedly recrystallized from methanol, the final crystals weighed 0.025 and 0.01 part by weight, respectively.

2. Analysis of the crystals obtained.

Various physicochemical analyses were performed on the crystals.

Table 3

| | Physicochemical properties of pepsinostreptin and pepsinostreptin-P | |
|---|---|---|
| | Pepsinostreptin | Pepsinostreptin-P |
| 1.m.p. | 236°–238°C | 210°–212°C |
| 2.$[\alpha]_D^{25}$ | –91.5°(0.53 %, methanol) | –92.9°(0.49 %, methanol) |
| 3.Elemental analysis | C,59.12;H,9.34; N,10.59 | C,57.53;H,9.05; N,10.52 |
| 4.Ultraviolet absorption spectrum | no absorption maxima at 210–400mμ | no absorption maxima at 210–450mμ |
| 5.Infrared absorption spectrum | see FIG.1 | see FIG.2 |
| 6.Nuclear magnetic resonance spectrum | see FIG.3 | see FIG.4 |
| 7.Mass spectrum of the methyl ester | see FIG.5 molecular ion peak: 685 m/e | see FIG.6 molecular ion peak: 671 m/e |
| 8.ID$_{50}$ against pepsin (5 μg) | 0.048 μg | 0.05 μg. |
| 9.Components | alanine:valine:4-amino-3-oxy-6-methyl- | alanine:valine:4-amino-3-oxy-6-methyl- |

Table 3-Continued

Physicochemical properties of pepsino-
streptin and pepsinostreptin-P

| Pepsinostreptin | Pepsinostreptin-P |
|---|---|
| heptanoic acid= | heptanoic acid= |
| 1:2:2 | 1:2:2 |
| about 1.1 mg of | about 1.0 mg of |
| isobutylic acid from | propionic acid from |
| 10 mg of crystals | 10 mg of crystals |

EXAMPLE 2

1. Production

Streptomyces citricolor Ferm-P-No. 393(ATCC 21925) was used to inoculate 30 parts by volume of a liquid medium (pH 7.0) in a flask with a capacity of 200 parts by volume, composed of 3 percent glucose, 2 percent corn steep liquor, 0.05 percent dipotassium hydrogen phosphate, 0.02 percent ammonium sulfate, 0.05 percent magnesium sulfate, 0.5 percent calcium carbonate and the inoculated medium was incubated on a rotary shaker at 28°C for 2 days. The resulting culture was transferred to a flask with a capacity of 2,000 parts by volume containing 500 parts by volume of the same medium as above and the flask was incubated on a reciprocating shaker at 28°C for 2 days. The resulting culture was transferred to a fermentor of 50,000 parts by volume in capacity containing 30,000 parts by volume of the same liquid medium as above and, with the addition of an antifoaming agent, the inoculated medium was incubated at 28°C for 2 days with stirring and aeration.

The resulting culture was used to inoculate 1,000,000 parts by volume of a liquid medium (pH 7.0) contained in a fermentor with a capacity of 2,000,000 parts by volume, which comprised 1 percent glucose, 3 percent peptone, 0.7 percent meat extract, 0.3 percent sodium chloride and 0.2 percent dipotassium phosphate and, with the addition of about 500 parts by weight of an antifoamingagent, the inoculated medium was incubated at 280°C with aeration and stirring for 3 days to obtain about 1,000,000 parts by volume of a culture broth.

This culture broth contained a pepsin-inhibitory activity of 10.5 µg/ml in terms of pepsinostreptin, but by the combined use of thin layer chromatography and the pepsin-inhibitor assay method using a casein-pepsin agar plate which is to be described below, it was found that this culture broth contained at least two different pepsin-inhibitors.

2. analysis

Thin layer chromatography was carried out on broth samples using a solvent system of ethyl acetate-methanol (4:1) and then removed the solvent adhering to the layer was evaporated to obtain a dry layer. Meanwhile, a 3 percent aqueous agar solution was prepared and admixed with a 0.4 percent casein solution (ph 2.0) in a ratio of 1:1(v/v). After the mixture was cooled to 50°C, a solution of crystalline pepsin was added to give a concentration of 2 mg per 100 ml of the mixture, quickly followed by stirring.

The mixture was put in a petri dish and allowed to stand for a little while to prepare a casein-pepsin agar plate of 2 to 3 mm in thickness. The dry thin layer prepared above was superimposed on this agar plate and the whole was maintained in the cold for about 10 minutes to allow the active factors developed on the thin layer to diffuse into the agar. Then, the thin layer was stripped off and the agar plate was allowed to stand at 37°C overnight. The agar plate turns transparent due to the proteolytic action of pepsin, but if a substance inhibitory to pepsin is present, the agar remains opaque and turbid. Therefore, this method provides an expedient test for pepsin-inhibitors. By this method, two inhibitors were detected which gave distinct spots at Rf 0.75 – 0.85 and Rf 0.4 – 0.5, respectively, in a thin layer chromatographic run with the above-mentioned solvent system.

Therefore, these two substances were separated and independently purified. First, the above culture broth was adjusted to pH 4 with hydrochloric acid and, then, filtered by means of a filter press. The filtration was adjusted to pH 8 with a solution of sodium hydroxide and, then, extracted with 300,000 parts by volume of n-butanol. The n-butanol layer was concentrated and one tenth in weight of the concentrate was treated with activated carbon.

The carbon was filtered off. The filtrate was run onto a column of silica gel and the active fraction was desorbed with a solvent mixture of ethyl acetate methanol (4:1). All active fractions were pooled, concentrated and chromatographed on a silica gel column under the same conditions as above to obtain active fractions I and II separately. Fraction I was concentrated and the concentrate was chromatographed using a column of silica gel and a solvent mixture of benzenemethanol-acetic acid 990:10:1). The active fraction thus obtained was concentrated and run onto a column of activated carbon. After washing with 60 percent aqueous methanol, the active fraction was eluted with methanol and the elute was concentrated. This concentrate was further run onto a column of Sephadex LH-20 (Pharmacia Fine Chemicals) and the active fraction was eluted with methanol. The elute was concentrated and allowed to stand, wereupon 0.10 part by weight of white needles (I) were obtained.

Meanwhile, under the same conditions as employed for active fraction I, fraction II was purified by column chromatography on silica gel and activated carbon columns to obtain 0.41 part by weight of white needles (II) from a methanol solution. The Rf values of these products on the above mentioned thin layer chromatogram were 0.75 to 0.85 for I and 0.4 to 0.5 for II.

Table 4 shows the various physicochemical data on I, II and II-methyl ester, the last one being prepared by treating II with diazomethane. The infrared absorption spectra of these compounds are shown in FIG. 7.

Table 4

| | Physicochemical properties of I, II and II-methyl ester | | |
|---|---|---|---|
| | I | II | II-methyl ester |
| m.p. | 270 – 272°C | 237 – 239°C | 271 – 273°C |
| $[\alpha]_D^{25}$ | –91°(0.25 %, methanol) | –95°(0.5 %, methanol) | –85°(0.5 %, methanol) |
| Elementary analysis | ($C_{34}H_{63}N_5O_9$) | ($C_{33}H_{61}N_5O_9$) | ($C_{34}H_{63}N_5O_9$) |
| Calcd. | C,59.56; | C,59.02; | C,59.56; |
| | H, 9.20; | H, 9.09; | H, 9.20; |
| | N,10.22 | N,10.43 | N,10.22 |
| Found | C,59.50; | C,58.50; | C,59.21; |
| | H, 9.16; | H, 9.14; | H, 9.35; |
| | N,10.03 | N,10.51 | N, 9.71 |

From these data and the results of experiments conducted by the various analytical procedures described in Example 1, II was identified to be pepsinostreptin as obtained in Example 1.

On the other hand, I was in complete agreement with II in its constituent amino acids and fatty acids. The molecular formula assigned to I from its elementary analysis (Table 4) was $C_{34}H_{63}N_5O_9$ and this was in excess of the similarly calculated molecular formula of II, $C_{33}H_{61}N_5O_9$, by one carbon atom and two hydrogen atoms. From these experimental data, I was finally determined to be methyl ester of II.

The pepsin-inhibitory activities, $ID_{50}$, were 0.054 μg. for crystals I and 0.045 μg. for crystals II.

EXAMPLE 3

*Streptomyces ramulosus* IFO 12812 (ISP 5100) was used to inoculate 30 parts by volume of a liquid medium (pH 7.0) in a flask with a capacity of 200 parts by volume which was composed of 5 percent dextrin, 3 percent soybean meal, 0.7 percent peptone, 0.5 percent calcium carbonate, 0.05 percent ferrous sulfate, 0.05 percent maganese sulfate, 0.05 magnesium sulfate, 0.05 percent dipotassium phosphate and varying concentrations of a member selected from the group of DL-valine, L-valine, D-valine, N-acetyl-DL-valine and N-benzoyl-DL-valine. The inoculated medium was incubated on a rotary shaker at 28°C for 4 days and the output of pepsinostreptin in the resulting culture broth was measured.

The results are set forth in Table 5.

Table 5

Effect of the addition of valine and N-acylvaline on the accumulation of pepsinostreptin

| Additive, % | | Pepsinostreptin accumulated (mg./ml) |
|---|---|---|
|  |  | 0.13 |
| DL-valine | 0.25 | 0.28 |
|  | 0.5 | 0.42 |
|  | 1.0 | 0.67 |
|  | 2.0 | 0.99 |
|  | 4.0 | 0.84 |
| L-valine | 2.0 | 1.03 |
| D-valine | 2.0 | 0.98 |
| N-acetyl-DL-valine | 2.0 | 0.95 |
| N-benzoyl-DL-valine | 2.0 | 0.80 |

EXAMPLE 4

*Streptomyces citricolar* Ferm-P-No.393 (ATCC 21925) was cultivated at 280°C for 4 days by a procedure similar to that described in Example 3 and the accumulated amounts of pepsinostreptin and peptinostreptin methyl ester were independently assayed by the casein-pepsin agar plate method described in Example 2.

The results are set forth in Table 6.

Table 6

Effect of the addition of valine and N-acylvaline on the accumulation of pepsinostreptin and pepsinostreptin methyl ester

| Additive | | Pepsinostreptin accumulated (μg/ml) | Peptinostreptin metyl ester accumulated (μg/ml) |
|---|---|---|---|
|  |  | 8.0 | 2.1 |
| DL-valine | 2 % | 60 | 15 |
| L-valine | 2 % | 63 | 15 |
| D-valine | 2 % | 59 | 14 |
| N-acetyl-DL-valine | 2 % | 41 | 12 |
| N-benzoyl-DL-valine | 2 % | 39 | 10 |

EXAMPLE 5

*Streptomyces ramulosus* IFO 12812 or *Streptomyces catenulae* IFO 12848 (ATCC 12476) was used to inoculate 50 parts by volume of a liquid medium (pH 7.0) in a fermentor with 200 parts by volume in capacity which comprised 5 percent dextrin, 3 percent soybean meal, 0.7 percent peptone, 0.5 calcium carbonate, 0.05 ferrous sulfate, 0.05 percent manganese sulfate, 0.05 percent magnesium sulfate, 0.05 percent dipotassium hydrogen phosphate and varying concentrations of propionic acid, followed by incubation at 28°C for 4 days. The accumulated amount of pepsinostreptin-P in each of the resultant culture broth was measured. The results are set forth in Table 7.

Table 7

Effect of the addition of propionic acid on the accumulation of pepsinostreptin-P

| Concentration of propionic acid % | Pepsinostreptin-P accumulated (mg/ml) | |
|---|---|---|
|  | IFO 12812 | IFO 12848 |
| 0 | 0.05 | 0.02 |
| 0.5 | 0.31 | 0.10 |
| 1.0 | 0.56 | 0.19 |
| 2.0 | 0.80 | 0.28 |
| 3.0 | 0.68 | 0.23 |

EXAMPLE 6

*Streptomyces ramulosus* IFO 12812 was used to inoculate 500 parts by volume each of a liquid medium (pH 7.0) in two flasks with a capacity of 2,000 parts by volume which comprised 3 percent glucose, 2 percent corn steep liquor, 0.05 percent dipotassium hydrogen phosphate, 0.02 percent ammonium sulfate, 0.05 percent magnesium sulfate and 0.5 calcium carbonate. Each of the flasks was incubated on a reciprocating shaker at 28°C for 2 days to obtain 1,000 parts by volume of a culture.

This seed culture was transferred to a fermentor with a capacity of 50,000 parts by volume containing 30,000 parts by volume of the same medium as above and whole was incubated under aeration and stirring at 28°C for 2 days.

The resultant culture was further transferred to a fermentor with a capacity of 2,000,000 parts by volume containing 1,000,000 parts by volume of a liquid medium (pH 7.0) which comprises 5 percent dextrin, 3 percent soybean meal, 0.7 percent peptone, 0.5 percent calcium carbonaate, 0.05 percent ferrous sulfate, 0.05 percent manganese sulfate 0.05 percent magnesium sulfate, 0.05 percent dipotassium phosphate and 0.5 percent sodium propionate (0.39 percent as propionic acid). With the addition of about 500 parts by weight of an antifoaming agent, the inoculated medium was incubated under aeration and stirring at 28°C. After 16 hours, there was added 100,000 parts by volume of a 15 percent aqueous solution of sodium propionate which had previously been adjusted to pH around 7.0 and sterilized, and the medium was further incubated under aeration and stirring for 74 hours. The resultant culture broth, about 1,100,000 parts by volume, was treated by the procedure to be described below to crystallize the pepsionstreptin-P. Thus, the culture broth was first filtered by means of a filter press with the aid of diatomaceous earth and the resultant filtrate was treated with 300,000 parts by volume of ethyl acetate. The ethyl acetate layer was discarded and the water layer was concentrated to about 850,000 parts by volume, adjusted to pH 4.0 with hydrochloric acid and applied on a column of 100,000 parts by volume of activated carbon (quality grade Shirasagi, Takeda Chemical Industries), whereby the active fraction was adsorbed.

The column was washed first with 200,000 parts by volume of water and then with 300,000 parts by volume of 40 percent methanol in water and the active fraction was desorbed with 500,000 parts of methanol. The eluate was concentrated to obtain 600 parts by weight of a powder containing pepsinostreptin-P.

A 50 parts by weight portion of this powder was dissolved in 3,000 parts by volume of 0.05N sodium hydroxide-methanol (55:45) and, after being adjusted to pH 10, the solution was run onto a column of 44,000 parts by volume (inner diameter to height is 1 to 7.) a macromolecular adsorbent e.g. Amberlite XAD-2 (Rohm & Haas) of 100–200 meshes.

The active fraction was eluted in a linear gradient system form 0.05N sodium hydroxide-methanol (55:45) to 0.05N sodium hydroxide-methanol (35:65), 200,000 parts by volume in total.

The first fraction amounting to 80,000 parts by volume was discarded and the subsequent fraction, amounting to 40,000 parts by volume, and containing pepsinostreptin-P, was collected and adjusted to pH 3 with hydrochloric acid, then applied on a column packed with 2,000 parts by volume of activated carbon.

The column was washed with water 40 percent methanol in water, followed by elution of pepsinostreptin-P with methanol. The elute was concentrated to dryness to harvest about 28 parts by weight of a white powder. This powder was dissolved in hot methanol and the solution was allowed to stand, whereupon 25 parts by weight of pepsinostreptin-P was obtained as white needles (m.p. 210°–211°C; elemental analysis: C 57.58; H, 9.06; N, 10.51).

EXAMPLE 7

Streptomyces ramulosus IFO 12812 and Streptomyces citricolor Ferm-P-No.393(ATCC 21925) were respectively used to inoculate 30 parts by volume of a liquid medium (pH 7.0) contained in a flask with a capacity of 200 parts by volume, which comprised 5 percent dextrin, 3 percent soybean meal, 0.7 percent peptone, 0.5 percent calcium carbonate, 0.05 percent ferrous sulfate, 0.05 percent manganese sulfate, 0.05 percent magnesium sulfate and 0.05 percent dipotassium hydrogen phosphate. With the addition of a 25 percent solution of sodium isobutyrate (adjusted to pH 7.0) either immediately after inoculation or in the course of cultivation, the inoculated medium was incubated on a rotary shaker at 28°C for 4 days. The outputs of pepsinostreptin and pepsinostreptin methyl ester in the resulting culture broth were independently assayed by the method described in Example 2. The results are set forth in Table 8.

Table 8

Effect of the addition of sodium isobutyrate on the accumulation of pepsinostreptin and pepsinostreptin methyl ester

| Microorganism | Mode of addition of sodium isobutyrate | Pepsino-streptin accumulated (mg/ml) | Pepsino-streptin methyl ester (mg/ml) |
|---|---|---|---|
| Streptomyces ramulosus IFO 12812 (ISP-5100) | no addition | 0.11 | |
|  | 0.5 % at 0 hr. | 0.43 | |
|  | 0.5 % at 18 hrs. | 0.48 | |
|  | 0.5 % at 0 hr. and 1.0 % at 18 hrs.(total 1.5 %) | 0.59 | |
| Streptomyces citricolor Ferm-P-No.393 (ATCC 21925) | no addition | 0.0072 | 0.0019 |
|  | 0.5 % at 0 hr. | 0.036 | 0.0074 |
|  | 0.5 % at 18 hrs. | 0.031 | 0.0087 |
|  | 0.5 % at 0 hr. and 1.0 % at 18 hrs. | 0.042 | 0.0093 |

EXAMPLE 8

Streptomyces citricolor Ferm-P-No.393 (ATCC 21925) was used to inoculate 30 parts by volume of a liquid medium (pH 7.0) contained in a flask with a capacity of 200 parts by volume which comprised 3 percent glucose, 2 percent corn steep liquor, 0.05 percent dipotassium hydrogen phosphate, 0.02 percent ammonium sulfate, 0.05 percent magnesium sulfate, 0.5 percent calcium carbonate.

The inoculated medium was incubated at 28°C for 2 days and transferred to a flask with a capacity of 2,000 parts by volume containing 500 parts by volume of the same medium as above for further 2 days incubation at 28°C. The resultant broth was transferred to a fermentor with a capacity of 50,000 parts by volume which contained a liquid medium (pH 7.0) composed of 1 percent glucose, 3 percent peptone, 0.7 percent meat extract, 0.3 percent sodium chloride, 0.2 percent dipotassium hydrogen phosphate, 0.5 percent sodium propionate (0.39 percent as propionic acid).

With the addition of about 20 parts by weight of an antifoaming agent, the inoculated medium was cultivated at 28°C under aeration and stirring. At 16 hours after the start 3,000 parts by volume of an aqueous propionic acid solution (15 percent) was added, and the incubation was made for further 50 hours to give about 33,000 parts by volume of the culture broth. This broth was filtered through a filter press and the filtrate was washed with ethyl acetate.

After eliminating the ethyl acetate layer, the aqueous phase was concentrated to 25,000 parts by volume and after the adjustment of pH to about 4.5, applied onto a column of activated carbon. The column was washed with water and methanol (40 percent aqueous solution) and then the active fraction was eluted.

The eluate was concentrated to give about 5 parts by weight of powder which was dissolved in water and applied onto a column of silica gel and the active fractions I and II were eluated from the column with ethyl acetatemethanol (5:1). The active fraction I was concentrated to evaporate ethyl acetate and methanol and subjected to a column of silica gel with a solvent system of n-butanolacetic acid-water-butyl acetate (30:1:1:30). Thus purified active fraction II was again applied onto a column of activated carbon.

The column was washed with methanol (50 percent aqueous solution) and the eluate was concentrated to dryness. The concentrate was dissolved in a small volume of methanol and kept standing to give 0.09 part by weight of white needles.

On the other hand, when the active fraction II was treated by the same manner as in the fraction I, about 0.32 part by weight of white needles separated out.

These two crystals were respectively determined to be pepsinostreptin-P methylester and peptinostreptin-P from their elemental analysis, m.p., amino acid composition, mass spectrum, etc.

What we claim is:

1. A protease inhibitor of the formula

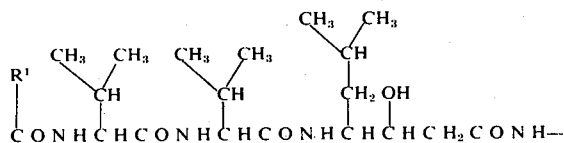

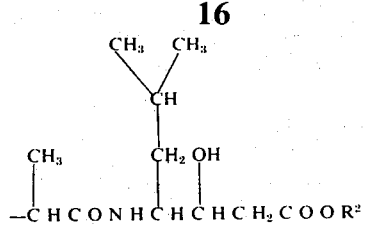

wherein $R^1$ is ethyl or isopropyl and $R^2$ is a hydrogen atom or methyl, and wherein the optical rotation of the protease inhibitor in methanol at 25°C is from about −85° to about −95°.

2. A protease inhibitor according to claim 1, wherein $R^1$ is isopropyl and $R^2$ is hydrogen, having an optical rotation at 25°C in methanol of from about −91.5° to about −95°.

3. A protease inhibitor according to claim 1, wherein $R^1$ is isopropyl and $R^2$ is methyl, having an optical rotation at 25°C in methanol of from about −85° to about −91°.

4. A protease inhibitor according to claim 1, wherein $R^1$ is ethyl and $R^2$ is hydrogen, having an optical rotation at 25°C in methanol of about −92.9°.

* * * * *